United States Patent [19]

Czyzewski

[11] Patent Number: 5,108,235

[45] Date of Patent: Apr. 28, 1992

[54] HOLE SAW ARBOR

[75] Inventor: Peter J. Czyzewski, Rockford, Ill.

[73] Assignee: Greenlee Textron Inc., Rockford, Ill.

[21] Appl. No.: 699,766

[22] Filed: May 14, 1991

[51] Int. Cl.⁵ .......................................... B23B 51/04
[52] U.S. Cl. ................................... 408/204; 408/209
[58] Field of Search ............... 408/204, 206, 209, 703

[56] References Cited

U.S. PATENT DOCUMENTS

| | | | |
|---|---|---|---|
| 2,674,026 | 4/1954 | St. Palley | 29/67 |
| 2,926,555 | 3/1960 | Joy . | |
| 3,679,220 | 7/1972 | Reeves | 279/1 |
| 3,758,221 | 9/1973 | Meshulam | 408/204 |
| 3,778,179 | 12/1973 | Rivas | 408/206 |
| 3,784,316 | 1/1974 | Bittern | 408/204 |
| 3,976,387 | 8/1976 | Segal | 408/204 |
| 4,036,560 | 7/1977 | Clark et al. | 408/204 |
| 4,148,593 | 4/1979 | Clark | 408/204 |
| 4,303,357 | 12/1981 | Makar | 408/204 |
| 4,699,928 | 6/1987 | Mediavilla | 408/68 |
| 4,755,087 | 7/1988 | Parent | 408/68 |
| 4,968,189 | 11/1990 | Pidgeon | 408/1 |

Primary Examiner—Daniel W. Howell
Attorney, Agent, or Firm—Trexler, Bushnell, Giangiorgi & Blackstone, Ltd.

[57] ABSTRACT

A hole saw arbor assembly connectable to a source of torque comprises an arbor having a first end and a second end. A power tool mount is disposed on the first end, and threads are disposed on the second end of a construction capable of mounting a hole saw thereon. A collar mount area is disposed on the arbor proximate to the second end, and a collar retraction area is disposed on the arbor proximate to the first end. A drive collar has a central bore therein, and the arbor is disposed through the central bore. The drive collar is capable of translation between the collar mount area and the collar retraction area, is rotatable about the collar retraction area independent of the arbor, and is incapable of rotation about the collar mount area independent of the arbor. Means for retaining the drive collar about the collar retraction area is disposed on the arbor. The drive collar has drive pins associated therewith, and the drive pins are insertable into apertures in the hole saw. Means for holding the drive pins within the apertures is disposed on the arbor.

16 Claims, 1 Drawing Sheet

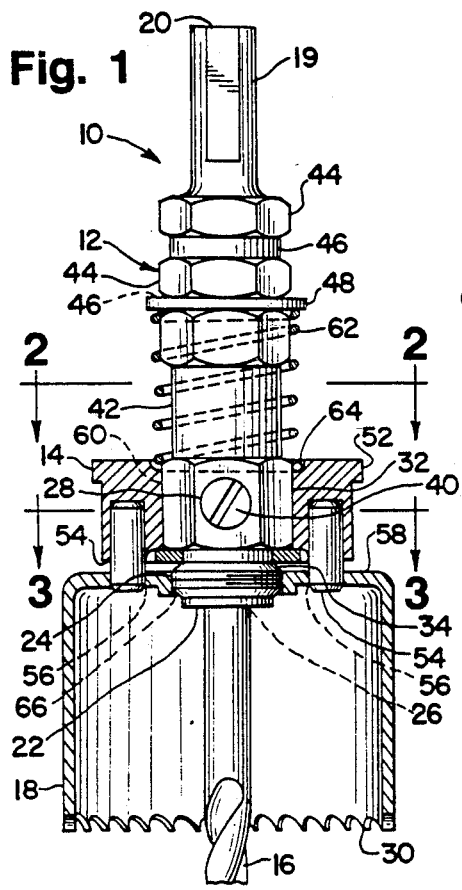
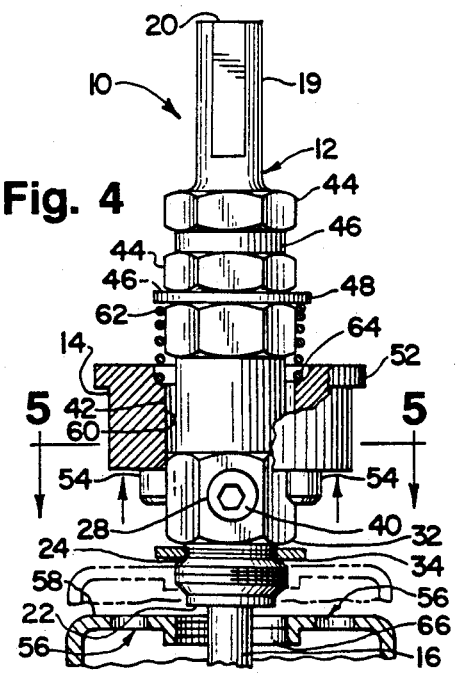
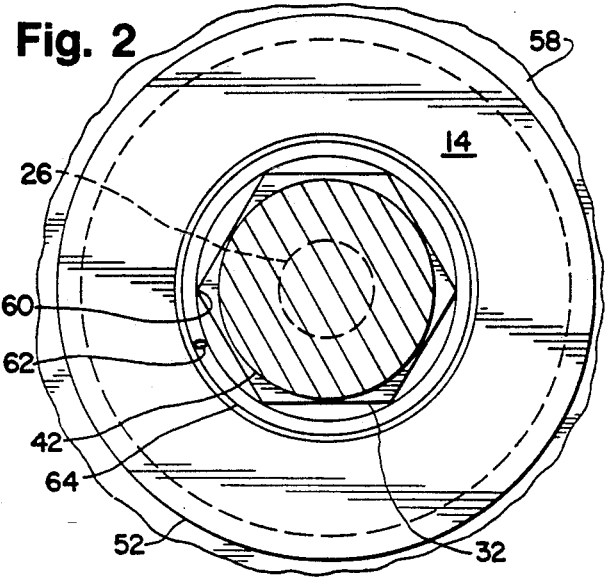
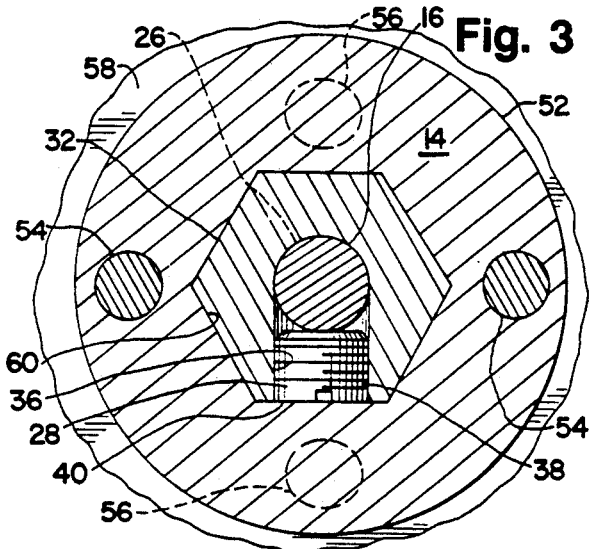
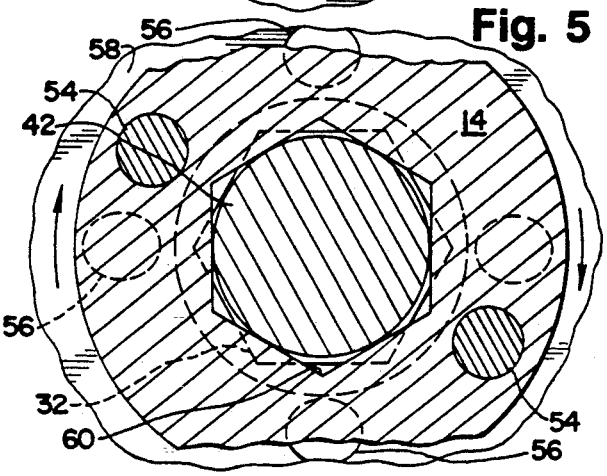

HOLE SAW ARBOR

BACKGROUND AND SUMMARY OF THE INVENTION

The present invention relates generally to a new and improved construction of an arbor for use with a hole saw. More specifically, the invention relates to a hole saw arbor having a spring biased, quick release drive collar capable of translation between an extended and a retracted position and further capable of independent rotation about a central axis of the arbor when the drive collar is in the retracted position to facilitate alignment of the drive pins on the collar with the drive apertures in the hole saw base, and also to provide a unique means for maintaining the collar in a retracted position while the saw is threaded on the arbor.

Various general constructions of hole saw arbors, and associated quick release drive collars, are well known in the field, as is evidenced by the following patents.

| Blanch, et al. | 1,645,736 | 10/18/27 |
| St. Palley | 2,674,026 | 04/06/54 |
| Elsy | 2,754,864 | 07/17/56 |
| Benjamin, et al. | 2,727,748 | 12/20/55 |
| Webster | 2,917,975 | 12/22/59 |
| Morse | 3,647,310 | 03/07/72 |
| Reeves | 3,679,220 | 07/25/72 |
| Segal | 3,976,387 | 08/24/76 |
| Bixler | 4,893,426 | 01/16/90 |

The general construction of a hole saw arbor employs a first end constructed so as to be insertably attached to an air or electrically powered tool, such as a drill, which can supply the necessary torque to the hole saw and a second end to which a hole saw and a drill bit, used to drill a pilot hole for the hole saw, are engaged. The hole saw is threadably attached to the second end. This means of attachment, while satisfactory for small diameter hole saws, a singular threaded connection is unacceptable for larger diameter hole saws. More specifically, the larger the diameter of the hole saw, the greater the torque created during cutting. This torque can cause the threads on the saw base and the arbor to be over torqued, resulting in galling and damage to the threads. If this damage occurs it is particularly difficult for a workman to remove the hole saw from the arbor or to re-assemble the saw for later use.

Thus, it was necessary to provide means capable of preventing torque on the hole saw from being transmitted directly to the threads. As disclosed in a number of prior art patents, and more specifically in the patent of Meshulam, U.S. Pat. No. 3,758,221, a plate or collar is provided having a plurality of drive pins or projections. The drive projections are inserted into apertures in the hole saw, and this interconnection accommodates the torque present on the hole saw. However, with this prior art design the drive plate and the hole saw are held on the second end by means of a nut. This construction results in an extended time period necessary to change hole saws.

The patent of Bittern, U.S. Pat. No. 3,784,316, discloses an improvement in hole saw arbors. A threaded drive ring having drive pins, insertable into apertures in the hole saw, is provided on the second end of the hole saw arbor, along with the hole saw, which is also threadably attached to the second end. Specifically, the threads attaching the drive ring to the arbor are oppositely directed to the threads attaching the hole saw to the arbor. For example, if the threads attaching the drive ring are left-handed, then the threads attaching the hole saw are right-handed. Additionally, a locking ring is provided, which is spring biased against the drive ring. This construction also demands an extended time period necessary to change hole saws.

The patents of Clark, et al., U.S. Pat. No. 4,036,560, and Clark, U.S. Pat. No. 4,148,593, disclose even further improvements in the construction of hole saw arbors. Specifically, a drive collar, having projecting pins insertable into apertures in the hole saw, is translatable between an extended and a retracted position along the hole saw arbor. The drive collar is maintained in either of these positions by means of a ball detent device. The hole saw is threaded onto the second end with the drive collar in the retracted position. Thereafter, the detent device is released, and the drive collar translated along the arbor so that the pins are inserted into the hole saw apertures.

The above-disclosed devices provide constructions that reduce the time period necessary for changing hole saws, however, there are still inherent disadvantages. The drive collar is not rotatable about the hole saw arbor. This means that a workman must align the pins on the drive collar with the apertures in the hole saw as he threads the hole saw on the arbor. It is difficult to perform this alignment with the drive collar in the retracted position, which was necessary to thread the hole saw onto the arbor. Also, if the hole saw is provided with but a single set of drive apertures, considerable manipulation is required to attain proper alignment.

The hole saw arbor construction of the present invention provides a quick release means that can reduce the time needed to, and increase the ease of changing hole saws. This new construction facilitates alignment of the drive pins on the drive collar with the apertures in the hole saw. Also, means for holding the drive pins firmly within the apertures are provided, as is means to maintain the collar in the retracted position as the hole saw is threaded on the arbor.

OBJECTS AND SUMMARY OF THE INVENTION

A general object of the present invention is to provide a hole saw arbor having a drive collar translatable between an extended and a retracted position, with the drive collar being rotatable about the hole saw arbor when the drive collar is in the retracted position.

Another object of the invention is to provide a hole saw arbor having a drive collar and means for retaining the drive collar in a retracted position.

A further object of the present invention is to provide a hole saw arbor having a drive collar wherein the drive collar is maintained in a retracted position by means of interference between the drive collar and the hole saw arbor.

An additional object of the invention is to provide a hole saw arbor having a retractable drive collar that is spring biased against a base flange of a hole saw in order to hold drive pins within the drive apertures in the base flange of the hole saw.

Another object of the present invention is to provide a hole saw arbor having a generally hexagonal cross section in portions thereof, and a circular cross section in portions thereof.

A further object of the invention is to provide a hole saw arbor having a drive collar having an internal bore having a generally hexagonal configuration.

An additional object of the present invention is to provide a hole saw arbor having a drive collar maintainable in a retracted position by means of misalignment of generally hexagonal configurations of the hole saw arbor and the drive collar.

A hole saw arbor assembly constructed according to the teachings of the present invention, connectable to a source of torque comprises an arbor having a first end and a second end. A power tool mount is provided on a the first ends, and threads are employed on the second end capable of having a hole saw mounted thereon. A drive collar is disposed on the arbor proximate to the second end, and a collar retraction area is defined at an intermediate location on the arbor. The drive collar has a central bore therein, and the arbor is engaged through the central bore. The drive collar is capable of translation between the collar mount area and the collar retraction area, and is rotatable about the collar mount area and the collar retraction area independent of the arbor. Means are provided for retaining the drive collar about the collar retraction area on the arbor. The drive collar has drive pins associated therewith, and the drive pins are insertable into apertures in the hole saw base flange. Means for holding the drive pins within the apertures is disposed on the arbor.

BRIEF DESCRIPTION OF THE DRAWINGS

The organization and manner of the structure and operation of the invention, together with further objects and advantages thereof, may best be understood by reference to the following description taken in connection with the accompanying drawings, wherein like reference numerals identify like elements in which:

FIG. 1 is an elevational view, partly broken away and partly sectioned, of a hole saw arbor assembly, constructed according to the teachings of the present invention, showing the unique construction thereof;

FIG. 2 is a sectional view, taken along line 2—2 of FIG. 1, showing the structural relationships of portions of the hole saw arbor;

FIG. 3 is a sectional view, taken along line 3—3 of FIG. 1, showing the disposition of elements of the hole saw arbor assembly in an operating configuration;

FIG. 4 is an elevational view, similar to that of FIG. 1, showing the disposition of the collar in a retracted position; and FIG. 5 is a sectional view, taken along line 5—5 of FIG. 4, illustrating the misalignment of the hexagonal configurations of the arbor and the collar misalignment that can be attained to maintain the collar is in a retracted position.

DETAILED DESCRIPTION OF THE PREFERRED EMBODIMENT

While the invention may be susceptible to embodiment in different forms, there is shown in the drawings, and herein will be described in detail, a specific preferred embodiment with the understanding that the present disclosure is to be considered an exemplification of the principles of the invention, and is not intended to limit the invention to that as illustrated and described herein. While the invention will be described with respect to a hole saw arbor, it is to be clearly understood that the present invention can also be successfully employed in other coupling tasks, and the scope of the invention is intended to encompass those other employments as well.

Referring initially to FIG. 1, a hole saw arbor assembly 10, constructed according to the teachings of the present invention, is shown. Generally, the hole saw arbor assembly 10 comprises an arbor 12, a drive collar 14, a drill bit 16, and a hole saw 18. The arbor 12 has a generally substantially hexagonal cross section, however, as will be discussed herein, portions of the arbor 12 are provided with a substantially circular cross section.

The arbor 12 has at least a first end 20 and a second end 22. The first end 20 has a cross section substantially smaller than a corresponding cross section of the second end 22. The first end 20 of the arbor 12 forms a power tool mount 19 which has a substantially hexagonal surface, and is constructed, and is of sufficient size so as to be insertable into a power tool, such as an air operated or electric drill or the like. When the power tool mount 19 is firmly mounted in the power tool, the means by which are well known in the art, the power tool, when energized, is capable of rotating the arbor 12, thereby applying a torque to the hole saw 18 for cutting a hole in a desired material.

The second end 22 of the arbor 12 has threads 24 thereon of sufficient size and pitch so as to be able to accept the hole saw 18, as will be discussed herein. At the second end 22, and specifically the threads 24, the arbor 12 has a substantially circular cross section. However, the cross sectional area at the second end 22 is still larger than a corresponding cross sectional area of the first end 20.

The second end 22 also has a drill bit bore 26 therein. The drill bit bore 26 is of sufficient size to accept the drill bit 16. The drill bit 16 is held firmly within the drill bit bore 26 by means of a compression force applied by a set screw 28, as will be described herein. The drill bit bore 26 is disposed coaxially inside the arbor 12, and extends a certain length from the second end 22 towards the first end 20 so as to accept the drill bit 16, and to hold the drill bit 16 firmly by means of the compression applied by the set screw 28.

When the drill bit 16 is mounted within the drill bit bore 26, a work entering end of the drill bit 16 extends beyond cutting teeth 30 disposed on a distal end of the hole saw 18. The drill bit 16 is held firmly within the drill bit bore 26 by the set screw 28, as shown in FIG. 3, so that the drill bit 16 is incapable of independent rotation, but is capable of co-rotation with the arbor 12 and the hole saw 18. The drill bit 16 is capable of making a pilot hole in the material to be cut by the hole saw 18, when the power tool is energized and rotates the arbor 12.

The arbor 12, between the threads 24 and the first end 20 has a substantially hexagonal cross sectional area, again substantially greater than a corresponding cross sectional area of the first end 20. At this point, the arbor 12 forms a collar mount area designated generally 32, the function of which will become clear from the discussion to follow herein. A collar retaining ring 34 is disposed on a circular cross sectional area of the arbor 12 between the collar mount area 32 and the threads 24. Thus, a terminal end of the threads 24 opposite to the second end 22 of the arbor 12, and a terminal end of the collar mount area 32 opposite to the first end 20 of the arbor 12 is defined by the collar retaining ring 34. The collar retaining ring 34 has an inner diameter sufficient to accept the arbor 12, at a point between the threads 24 and the collar mount area 32, and has an outer diameter substantially greater than an outer diameter of the collar mount area 32. The collar retaining ring 34 may be constructed similar to the well known construction commonly referred to in the art as a "quick-snap C." The function of the collar retaining ring 34 will become apparent in the foregoing discussion.

A substantially radial recess 36, having set screw threads 38 therein, is disposed through the arbor 12 at the collar mount area 32. The recess 36 communicates from one edge of the collar mount area 32 to the drill bit bore 26. The recess 36 is of sufficient size, and the set screw threads 38 are of sufficient size and pitch so as to be able to accept the set screw 28. Thus, as alluded to above, the drill bit bore 26 must extend from the second end 22 of the arbor 12 at least to an end of the recess 36 proximate to the first end 20 of the arbor 12. The set screw 28 has a slotted, or other sufficiently functional configuration, such as a hex, head 40 which either lies flush with, or is recessed with respect to, an exterior surface of the collar mount area 32 when the set screw 28 is properly threaded into the recess 36. The reason for having the set screw 28 either flush with, or recessed in the exterior surface of the collar mount area 32 will be discussed herein. An end of the set screw 28 opposite to the head 40 is constructed so as to apply a compression force to the drill bit 16, thereby firmly holding the drill bit 16 inside the drill bit bore 26 for uniform co-rotation with the arbor 12.

The collar mount area 32 is of a hexagonal configuration and extends only a certain distance between the collar retaining ring 34 and the power tool mount 19 of the arbor 12. A collar retraction area 42 is disposed on the arbor 12 adjacent the collar mount area 32 and between the collar mount area 32 and the power tool mount 19 of the arbor 12. It should be noted that the collar retraction area 42 has a circular cross sectional area, not a hexagonal cross sectional area as does the collar mount area 32. Additionally, the cross sectional area of the collar retraction area 42 is smaller than a corresponding cross sectional area of the collar mount area 32. An exterior surface of the collar retraction area 42 is substantially smooth and free of burrs. Preferably, the drill bit bore 26 extends through the collar retraction area 42, so that greater support will be given to the drill bit 16. The collar retraction area 42, like the collar mount area 32, extends only a certain distance along the arbor 12, from the collar mount area 32 to the power tool mount 19. The definition of the specific lengths of the collar mount area 32 and the collar retraction area 42 will be discussed herein. A terminal end or shoulder portion for the collar mount area 32, opposite to the end defined by the collar retaining ring 34, is thusly defined by the collar retraction area 42, as shown in FIG. 2.

A terminal end of the collar retraction area 42 is defined by an hexagonal area 44 disposed on the arbor 12. The hexagonal area 44 has a cross section that is substantially similar to a corresponding cross section of the collar mount area 32. A terminal end of the power tool mount 19, opposite to the first end 20, is defined by the hexagonal area 44. Portions are removed from an exterior surface of the hexagonal area 44, thereby forming areas 46 having a circular cross section. A spring retaining ring 48, similar in construction to the collar retaining ring 34, is disposed on the arbor 12 at one of the areas 46.

Thusly, the entire arbor 12 is defined. Beginning at the first end 20, the power tool mount 19 is first encountered, then the hexagonal area 44 having portions removed to form the areas 46 of circular cross section bearing the spring retaining ring 48, followed by the collar retraction area 42, the collar mount area 32 having a recess 36 therein to accept the set screw 28, the collar retaining ring 34, the threads 24, the second end 22, the hole saw 18, and, finally, the drill bit 16. The further construction of the hole saw arbor assembly 10 is as follows.

A drive collar 14 is disposed around the arbor 12 proximate to the collar mount area 32 and the collar retraction area 42. The exterior of the drive collar 14 is substantially cylindrical in nature, however, a knurl or shoulder 52 is formed on an end thereof, which facilitates in gripping of the drive collar 14 so as to ease translation of the drive collar 14. A plurality of drive pins 54 are provided on an end of the drive collar 14 opposite to the knurl 52. The drive pins 54 are constructed to be engaged in the hole saw drive apertures 56 so as to transfer torque to the hole saw 18 as will be discussed herein.

As shown in FIG. 1, the drive pins 54 are substantially cylindrical in nature, and are designed to be insertable into apertures 56 in a base flange 58 of the hole saw 18, when the hole saw 18 is mounted on the threads 24 on the second end 22 of the arbor 12. It is to be noted that other configurations of drive pins 54 may be used, as long as the configuration thereof matches the configuration of the apertures 56 in the hole saw 18.

The drive collar 14 itself must be able to surround the arbor 12 to a certain extent. Thus, the drive collar 14 has a central hexagonal bore 60 therein. The central hexagonal bore 60 extends through the drive collar 14 substantially perpendicular to a radius thereof In this manner, the arbor 12 can be inserted into the central hexagonal bore 60.

Because the drive pins 54 must be maintained in the apertures 56 in the hole saw 18, means for maintaining the drive pins 54 in the apertures 56 are provided. To meet this provision, a spring 62 is employed. The spring 62 has a diameter sufficient to accept the arbor 12, and is engaged against the spring retaining ring 48 and the drive collar 14. Then, the arbor 12 bearing the spring 62 is inserted into the central hexagonal bore 60 of the drive collar 14. The drive collar 14 has a depression 64 along an end thereof bearing the knurl 52 of sufficient size to accept an end of the spring 62 opposite to the spring retaining ring 48. The diameter of the spring 62 is greater than a diameter of the central hexagonal bore 60, and thus the spring 62 rests within the depression 64. In operation, the spring 62 biases the drive collar 14 against the base flange 58 of the hole saw 18.

As the arbor 12 is inserted into the central hexagonal bore 60 in the drive collar 14, the spring 62 is compressed between the spring retaining ring 48 and the depression 64 in the drive collar 14. This compression of the spring 62 generates spring forces which are sufficient to maintain the drive pins 54 within the apertures 56 in the hole saw 18. In order to retain this compression, the collar retaining ring 34 is added in the above-discussed disposition. Thus, the spring 62 is always compressed sufficiently to provide sufficient force to maintain the drive pins 54 within the apertures 56 in the hole saw 18.

The configuration of the central hexagonal bore 60 in the drive collar 14 is hexagonal in shape. The hex configuration of the central hexagonal bore 60 is constructed so as to engage in non-rotational fashion with the hex configuration of the collar mount area 32 on the arbor 12. When the hex configurations on the central hexagonal bore 60 and the collar mount area 32 are engaged, any torque transmitted by a power tool (not shown) to the arbor 12 is also transmitted to the drive collar 14, and from the drive pins 54 to the hole saw 18, without reliance upon the threaded connection between the saw 18 and the arbor 12. This eliminates any torque which may have been applied to the threads 24. To increase the effectiveness of the torque transmittal, the length of the collar mount area 32 along the arbor 12 is substantially equal to a corresponding length of the drive collar 14.

Because the drive collar 14 is spring biased and free to move along the collar mount area 32, further compression of the spring 62 can allow the drive collar 14 to translate away from the second end 22 towards the first end 20. Given sufficient compression of the spring 62, the drive collar 14 can be translated from the collar mount area 32 to the collar retraction area 42, as shown in FIG. 4. By so translating the drive collar 14, the hex configurations on the collar mount area 32 and the central hexagonal bore 60 are disengaged. Because the cross sectional area of the collar retraction area 42 is circular, and because the surface thereof is smooth and free of burrs, the drive collar 14 can, in this condition, be rotated about the collar retraction area 42. Additionally, the length of the collar retraction area 42 along the arbor 12 is slightly larger than a corresponding length of the drive collar 14. Also, it should be noted that when the drive collar 14 is aligned with the collar retraction area 42, the pins 54 are disengaged from the drive apertures 56.

This means that once the drive collar 14 is disposed about the collar retraction area 42, the drive collar 14 can be rotated with respect to the arbor 12, thereby misaligning the hex configurations on the collar mount area 32 and the central hexagonal bore 60, as shown in FIG. 5. With the hex configurations misaligned, the drive collar 14 can be released. The spring 62 will force the drive collar 14 towards the second end 22, but the interference between the misaligned hex configurations will maintain the drive collar 14 in the retracted position disposed about the collar retraction area 42. A key aspect of the construction is the similarity in the configurations of the collar mount area 32 and the central hexagonal bore 60, combined with the dissimilarity thereof with the collar retraction area 42. Preferably, the configurations are hex and circular, however, other configurations, or combinations thereof can also be used.

Thus, with the drive collar 14 held or maintained in the retracted position of FIG. 4, the operator's hands are free to assemble or disassemble the saw 18 to the arbor end 22. Assuming assembly, the operator will attain proximate alignment of the drive pins 54 with the drive apertures 56 through rotation of the saw 18 and/or the collar 14. Once the saw 18 is in proximate position, the collar 14 is rotated to align the hexagonal bore 60 with the hexagonal configuration of the collar mount area 32. Under the influence of the spring 62, the drive collar 14 will move axially to dispose the drive pins 54 into the drive apertures 56. If slight misalignment between the pins 54 and apertures 56 is encountered, the operator need only rotate the hole saw 18 slightly to attain the desired alignment. Correspondingly, upon disassembly of the saw 18, the drive collar 14 is retracted and aligned with the circular retraction area 42, and is then rotated slightly to attain misalignment of the hexagonal configurations, as shown in FIG. 5. The operator can now release the collar 14 and it will remain in the retracted position of FIG. 4. Accordingly, his hands are now free to disassemble the saw 18 from the arbor end 22.

The operation of the hole saw arbor assembly 10 will become clear in the following paragraphs. Beginning with a completely constructed arbor 12 (i.e. spring 62, drive collar 14, spring retaining ring 48, and collar retaining ring 34 in place) with the drive collar 14 in the retracted position, shown in FIG. 4, and with the hex configurations misaligned, as shown in FIG. 5, a drill bit 16 is selected of sufficient size to drill an appropriate pilot hole. The drill bit 16 is inserted within the drill bit bore 26 far enough so that an edge of the drill bit 16 can be contacted by the set screw 28. The set screw 28 is threaded into the recess 36 until the set screw 28 firmly engages the drill bit 16. The set screw 28 must be threaded into the recess 36 at least until the head 40 of the set screw 28 is flush with the exterior surface of the collar mount area 32, as shown in FIG. 3. If not, the set screw 28 will prevent the drive collar 14 from translating fully into the extended position, shown in FIG. 1.

With the drill bit 16 firmly mounted within the drill bit bore 26, the hole saw 18 is threaded onto the second end 22 of the arbor 12. A threaded aperture 66 in the base flange 58 of the hole saw 18 is brought into engagement with the threads 24. The hole saw 18 is threaded upon the second end 22 a distance sufficient to hold the hole saw 18 thereon. It is not necessary to thread the hole saw 18 through the entirety of the threads 24.

A workman now grips the drive collar 14 by the knurl 52 and rotates the drive collar 14 until the respective hex configurations on the central hexagonal bore 60 and the collar mount area 32 are aligned. With this done, the spring 62 forces the drive collar 14 downwards along the collar mount area 32 until the drive pins 54 either engage the base flange 58 of the hole saw 18, or until the drive pins 54 enter the apertures 56 in the hole saw 18. If the drive pins 54 engage the base flange 58 of the hole saw 18, all the workman need do is rotate the hole saw 18 slightly on the threads 24 until the drive pins 54 and the apertures 56 line up; the spring 62 does the rest. The hole saw arbor assembly 10 is now completed, and ready for sawing.

When the workman desires to change hole saws 18, all the workman need do is grip the drive collar 14 by the knurl 52 and translate the drive collar 14 into the collar retraction area 42. The workman then rotates the drive collar 14 with respect to the arbor 12 in order to misalign the hex configurations on the collar mount area 32 and the central hexagonal bore 60, as shown in FIG. 5. Now, the workman can simply back the hole saw 18 off of the threads 24, and repeat the above disclosed procedure with respect to another hole saw 18.

The hole saw arbor assembly 10, constructed according to the teachings of the present invention, presents numerous desirable aspects to a workman. The hole saw arbor assembly 10 can reduce the amount of time needed to change hole saws. Specifically, the workman need not line up the apertures 56 in the hole saw 18 with the drive pins 54, while the drive collar 14 is in the retracted position. The rotatability of the drive collar 14 about the collar retraction area 42 gives the workman greater flexibility in threading the hole saw 18 on the arbor 12. Also, the drive collar 14 can be maintained in the retracted position simply by rotating the drive collar 14 with respect to the arbor 12. A workman will likely find the hole saw arbor assembly 10 a much desired addition to his tool box.

While a preferred embodiment of the present invention is shown and described, it is envisioned that those skilled in the art may devise various modifications of the present invention without departing from the spirit and scope of the appended claims. The invention is not intended to be limited by the foregoing disclosure, but only by the following appended claims.

The invention claimed is:

1. A hole saw arbor assembly connectable to a power tool or other source of torque comprising: an arbor having a first end and a second end; a power tool mount located on the first end; threads disposed on the second end for mounting a hole saw thereon; a collar mount area disposed on the arbor proximate to the second end; a collar retraction area disposed on the arbor proximate to the collar mount; a drive collar having a central bore therein; the arbor disposed through the central bore; the drive collar capable of translation between the collar mount area and the collar retraction area; means on the drive collar and the collar retraction area of the arbor for permitting the drive collar to rotate about the collar retraction area independent of and with respect to the arbor upon application of an appropriate force to at least one of the arbor and the drive collar; means providing for interfering contact between the collar mount area of the arbor and the drive collar such that the drive collar is incapable of rotation about the collar mount area independent of the arbor; means for retaining the drive collar about the collar retraction area disposed on the arbor; the drive collar having drive pins associated therewith; the drive pins being insertable into apertures in the hole saw; and means for holding the drive pins within the apertures disposed on the arbor.

2. A hole saw arbor assembly as defined in claim 1 wherein the means for holding the drive pins within the apertures comprises a spring.

3. A hole saw arbor assembly as defined in claim 1 wherein the central bore has an internal configuration similar to a corresponding external configuration of the collar mount, and different from a corresponding configuration of the collar retraction area.

4. A hole saw arbor assembly as defined in claim 3 wherein the internal configuration of the central bore is substantially hexagonal.

5. A hole saw arbor assembly as defined in claim 3 wherein the external configuration of the collar retraction area is circular.

6. A hole saw arbor assembly as defined in claim 2 wherein the drive collar has a recess for accepting the spring so that the spring may bias the drive pins into the apertures.

7. A hole saw arbor assembly as defined in claim 1 wherein the means for retaining the drive collar about the collar retraction area comprises misaligned similar external and internal configurations of the collar mount area and the central bore, respectively.

8. A hole saw arbor assembly as defined in claim 2 further comprising a spring retaining ring for retaining the spring bout the arbor disposed on the arbor proximate to the first end; and the spring being compressible between the drive collar and the spring retaining ring.

9. A hole saw arbor assembly as defined in claim 1 further comprising a collar retaining ring for retaining the drive collar about the arbor disposed on the arbor proximate to the first end so that the drive collar cannot translate on the arbor between the first end and the collar retaining ring.

10. A hole saw arbor assembly as defined in claim 1 wherein a knurl is disposed on the drive collar for facilitating gripping and translation of the drive collar.

11. A hole saw arbor assembly connectable to a source of torque comprising: an arbor having a collar mount area and a collar retraction area; a drive collar having drive pins thereon and a central bore therethrough; the arbor being disposed through the central bore; the drive collar being capable of translation between the collar mount area and the collar retraction area; and means on the drive collar and the collar retraction area for permitting rotation of the drive collar about the collar retraction area independent of and with respect to the arbor upon application of an appropriate force to at least one of the arbor and the drive collar; and means providing for interfering contact between the collar mount area of the arbor and the drive collar such that the drive collar is incapable of rotation about the collar mount area independent of the arbor.

12. A hole saw arbor assembly as defined in claim 11 wherein the central bore has an internal configuration similar to a corresponding external configuration of the collar mount, and different from a corresponding configuration of the collar retraction area.

13. A hole saw arbor assembly as defined in claim 11 wherein the internal configuration of the central bore is substantially hexagonal.

14. A hole saw arbor assembly as defined in claim 11 wherein the external configuration of the collar retraction area is circular.

15. A hole saw arbor assembly as defined in claim 11 further comprising means for retaining the drive collar about the collar retraction area disposed about the arbor.

16. A hole saw arbor assembly as defined in claim 11 wherein the means for retaining the drive collar about the collar retraction area comprises misaligned similar external and internal configurations of the collar mount area and the central bore, respectively.

* * * * *